(No Model.)
W. F. STEINBAUGH.
CORN SHELLER.
No. 449,637. Patented Mar. 31, 1891.
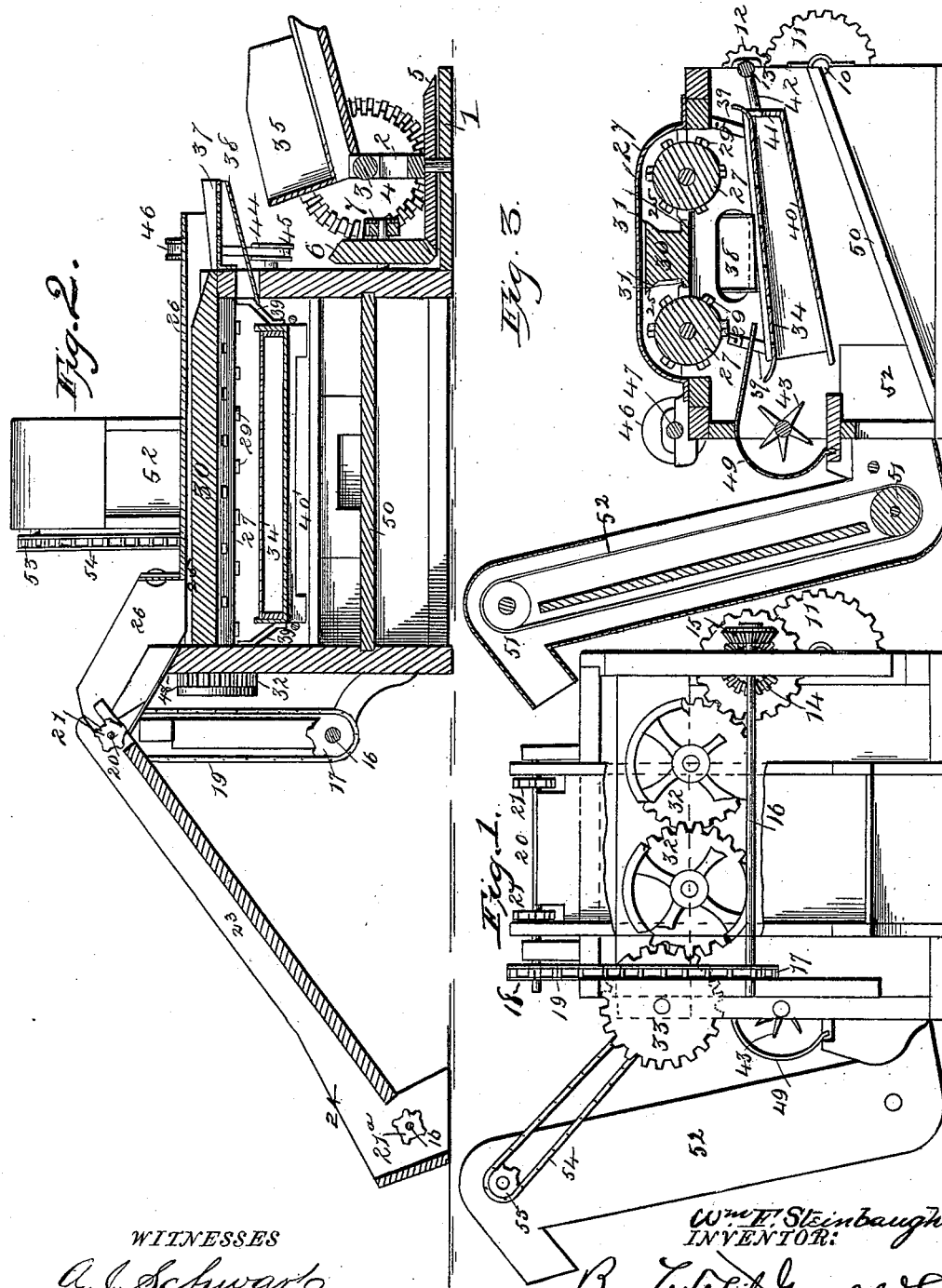
WITNESSES
A. J. Schwartz
J. E. Grant
Wm. F. Steinbaugh
INVENTOR:
By W. J. FitzGerald & Co.
Attorneys.

UNITED STATES PATENT OFFICE.

WILLIAM F. STEINBAUGH, OF PLATTE CENTRE, NEBRASKA, ASSIGNOR OF ONE-THIRD TO HENRY REUTING, OF SAME PLACE.

CORN-SHELLER.

SPECIFICATION forming part of Letters Patent No. 449,637, dated March 31, 1891.

Application filed September 11, 1890. Serial No. 364,694. (No model.)

*To all whom it may concern:*

Be it known that I, WILLIAM F. STEINBAUGH, a citizen of the United States, residing at Platte Centre, in the county of Platte and State of Nebraska, have invented certain new and useful Improvements in Corn-Shellers; and I do hereby declare the following to be a full, clear, and exact description of the invention, such as will enable others skilled in the art to which it appertains to make and use the same.

My invention consists in a new and improved corn-sheller which is comparatively simple in construction and exceedingly rapid, thorough, and effective in its operation, and my invention will be hereinafter fully described and claimed.

Referring to the accompanying drawings, Figure 1 is an end view. Fig. 2 is a central transverse sectional view. Fig. 3 is a central longitudinal sectional view.

The same numerals of reference indicate corresponding parts in all the figures.

On one end of a shaft 3 is secured the large bevel-wheel 4, which is driven by belting from any suitable source of power. This wheel meshes with a horizontal bevel-wheel 5, which in turn meshes with a vertical bevel-wheel 6. On the shaft of this latter wheel is secured a small sprocket-wheel 7, and a chain passes around this wheel and a larger sprocket-wheel on a shaft 10. A cog-wheel 11 on this latter shaft meshes with the cogged pinion 12 on that end of the crank-shaft 13, while a bevel-wheel 14 on the other end of the crank-shaft meshes with a bevel-wheel 15 on a transverse shaft 16. The corn to be shelled is placed in the hopper 24, formed at the lower end of a conveyer 23, which is hinged at its upper end on a transverse shaft 20 at the upper end of the machine. A conveyer-belt running over pulleys and sprocket-wheel 21 21ª lifts the corn and feeds it into the shelling-chamber 25, the shaft 21 being revolved through a chain 19, passing around sprocket-wheels 18 17 on the shafts 20 and 16. The conveyer 23, it will be seen, can be turned up over the top of the machine when not in use or when moving the machine from place to place. The shelling-chamber 25 is covered by a metal casing 26, open at both ends, and in this chamber revolve the shelling-cylinders 27. These shelling-cylinders are preferably formed of four curved metal plates bolted, as shown, to the ends of the cylinders and its circular central partition, and having teeth 29 arranged in spiral rows, as shown. These cylinders are arranged horizontally and parallel to each other in the upper part of the machine, as shown, and between them is secured the longitudinal sheller-bar 30. This bar is nearly T-shaped in cross-section, being formed on each side with the longitudinal top and bottom flanges or ribs 31. The ends of the cylinder-shafts have secured upon them the cog-wheels 32 32, which mesh with each other, and a cog-wheel 33 on the crank-shaft 13 meshes with one of these wheels, and thus revolves the shelling-cylinders. The corn fed into the shelling-chamber 25 falls upon the revolving cylinders, and the spirally-arranged rows of teeth 29, acting in conjunction with the sharp longitudinal upper and lower flanges of the central sheller-bar 30, will rapidly and effectually shell the grains from the cob. The shelled corn falls upon a sieve 34, arranged below the shelling-cylinders, while the spirally-arranged teeth of the cylinders work the cobs to the rear end of the shelling-chamber and discharge them into the inner end of a suitable stacker.

At the discharge end of the shelling-chamber 25 is arranged an apertured discharge-board 37, which overhangs the inner flanged end of the stacker 35. The object of this device is that if any grains of corn are carried out of the shelling-chamber with the cobs they will fall through these apertures, while the cobs pass on and will run down an inclined board 38 and fall upon the sieve 34.

34 indicates a sieve, which is suspended movably from hangers 39 below the shelling-cylinders. Below this sieve and secured to the end pieces thereof is arranged an inclined board 40, the rear end 41 of which extends upward to the sieve. The sieve and board are pivotally connected by rods 42 with the cranks of the crank-shaft 13, and as this shaft is revolved the sieve will be vibrated back and forth. The shelled corn, together with silk and other light refuse matter, falls from the shelling-chamber 25 upon the vibrating sieve and rests in temporary suspension thereon before falling through upon the inclined board 40. While thus suspended on the vibrating sieve they are acted upon by the air from a rotary fan 43, which blows the silk and light foreign matter out over the rear open end of the sieve, thus cleaning the shelled corn from foreign substances. The fan is revolved by a belt 44, passing around a pulley 45 on the end of its shaft and around a pulley 46 on the end of a shaft 47. This latter shaft has a cog-wheel 48 at its other end, which meshes with the cog-wheel of one of the shelling-cylinder shafts. The rotary fan is inclosed in a casing 49, which is open at both ends for the entrance of air to the fan. The shelled corn, after being cleaned on the vibrating sieve by the air-blast, falls upon the inclined board 40 and falls from the open lower end of the same upon the inclined bottom 50 of the machine near the lower end of the same, and from there passes down into the lower end of a suitable conveyer 52.

From the foregoing description, taken in connection with the accompanying drawings, the construction, operation, and advantages of my new and improved corn-sheller will be readily understood.

It will be seen that my corn-sheller is comparatively simple in construction and exceedingly rapid, thorough, and effective in its operation.

Having thus described my invention, what I claim, and desire to secure by Letters Patent, is—

1. The combination, in a corn-sheller, of two cylindrical drums having spirally-arranged teeth, in connection with the sheller-bar arranged to operate between the drums and formed with flanges projecting laterally on its upper and lower edges, as set forth.

2. The combination, in a corn-sheller, of two toothed cylindrical drums having arranged between them a central flanged sheller-bar within a shelling-chamber having a feed and discharge end, as and for the purpose set forth.

In testimony whereof I affix my signature in presence of two witnesses.

WILLIAM F. STEINBAUGH.

Witnesses:
H. H. BULKELEY,
JNO. P. DORR.